(12) United States Patent
Legall et al.

(10) Patent No.: US 10,801,538 B2
(45) Date of Patent: Oct. 13, 2020

(54) CLIP FOR RETAINING TWO PLANAR ELEMENTS

(71) Applicant: A. RAYMOND ET CIE, Grenoble (FR)

(72) Inventors: Antoine Legall, Fontaine (FR); Jean-Baptiste Chevrier, Saint Vincent de Mer-Cuze (FR); Richard Petri, Voiron (FR); Emmanuel Turlot, Grenoble (FR)

(73) Assignee: A. Raymond Et Cie, Grenoble (FR)

( * ) Notice: Subject to any disclaimer, the term of this patent is extended or adjusted under 35 U.S.C. 154(b) by 0 days.

(21) Appl. No.: 16/322,077

(22) PCT Filed: May 30, 2017

(86) PCT No.: PCT/FR2017/051341
§ 371 (c)(1),
(2) Date: Jan. 30, 2019

(87) PCT Pub. No.: WO2018/024951
PCT Pub. Date: Feb. 8, 2018

(65) Prior Publication Data
US 2019/0186518 A1 Jun. 20, 2019

(30) Foreign Application Priority Data

Aug. 4, 2016 (FR) ..................... 16 57553

(51) Int. Cl.
*F16B 5/06* (2006.01)
*F24S 25/632* (2018.01)
*F24S 25/634* (2018.01)

(52) U.S. Cl.
CPC .......... *F16B 5/0635* (2013.01); *F24S 25/632* (2018.05); *F24S 25/634* (2018.05); *Y02E 10/47* (2013.01)

(58) Field of Classification Search
CPC .. H02S 20/23; F24J 2/5256; F24J 2002/4665; F24S 25/634; F24S 2025/6004; F16B 5/0635
See application file for complete search history.

(56) References Cited

U.S. PATENT DOCUMENTS 6,279,207 B1   8/2001  Vassiliou
6,691,380 B2*  2/2004  Vassiliou .............. F16B 5/0614
                                                                 24/289

(Continued)

FOREIGN PATENT DOCUMENTS

DE  202008013005 U1  2/2010
WO  2013/082125 A1   6/2013
WO  2015/124280 A1   8/2015

OTHER PUBLICATIONS

International Written Opinion for International Application No. PCT/FR2017/051341 dated Sep. 29, 2017, 4 pages.

(Continued)

*Primary Examiner* — Gisele D Ford
(74) *Attorney, Agent, or Firm* — TraskBritt

(57) ABSTRACT

A clip for retaining two planar elements assembled together on the main face thereof includes at least two side walls, each equipped with a groove opening and configured to enable the clip to be inserted on the two assembled planar elements and retain them against one another. At least one of the side walls is equipped with a slot opening into the groove and defining a flexible arm secured to the rest of the wall by a bending area. The free end of the flexible arm supports a stop partially blocking at least the groove.

7 Claims, 3 Drawing Sheets

(56) References Cited

U.S. PATENT DOCUMENTS

| | | | |
|---|---|---|---|
| 7,428,770 B2 * | 9/2008 | Dickenson | F16B 5/0614 |
| | | | 24/289 |
| 2005/0241918 A1 | 11/2005 | Alldredge et al. | |
| 2013/0102165 A1 | 4/2013 | Dupont | |
| 2014/0003861 A1 | 1/2014 | Cheung et al. | |
| 2014/0037373 A1 * | 2/2014 | Cui | H02S 20/00 |
| | | | 403/379.5 |
| 2017/0268559 A1 * | 9/2017 | Wilusz | F16B 37/043 |
| 2018/0156496 A1 * | 6/2018 | Chevrier | F24S 25/634 |
| 2018/0163756 A1 * | 6/2018 | Schulz | F16B 2/245 |
| 2018/0191289 A1 * | 7/2018 | Zhu | H02S 20/23 |
| 2018/0226918 A1 * | 8/2018 | De Vogel | H02S 40/30 |

OTHER PUBLICATIONS

International Search Report for International Application No. PCT/FR2017/051341 dated Sep. 29, 2017, 3 pages.

* cited by examiner

CLIP FOR RETAINING TWO PLANAR ELEMENTS

CROSS-REFERENCE TO RELATED APPLICATIONS

This application is a national phase entry under 35 U.S.C. § 371 of International Patent Application PCT/FR2017/051341, filed May 30, 2017, designating the United States of America and published as International Patent Publication WO 2018/024951 A1 on Feb. 8, 2018, which claims the benefit under Article 8 of the Patent Cooperation Treaty to French Patent Application Serial No. 1657553, filed Aug. 4, 2016.

TECHNICAL FIELD

The present disclosure relates to a clip for retaining two planar elements. In particular, it is applicable for attaching the frame of a photovoltaic panel on a rail of a supporting structure.

BACKGROUND

Document DE102014007971 discloses a metallic clip for retaining together two planar elements placed in contact at the level of the main faces thereof. The U-shaped metallic clip consists of two main wings, defining a recess wherein the assembly formed of the two planar elements can be inserted. The insertion leads to the elastic deformation of the clip and to the application, by way of the two main wings, of forces for retaining the two planar elements together.

One of the two planar elements may form part of the frame of a photovoltaic panel, and the other planar element may form part of a rail of a supporting structure. A plurality of such clips may be placed around the periphery of the panel for attaching the panel to the supporting structure, which may be located, for example, on the roof of a dwelling. The panel may be subject to high loads, for example, by the forces applied by wind, tending to separate the panel from the supporting structure. However, the clip that has just been described has a low mechanical strength, and one of the main wings of the U-shaped clip may be easily broken under such loads.

BRIEF SUMMARY

The present disclosure aims to overcome all or part of the drawbacks of the prior art.

In view of achieving one of these goals, the subject matter of the present disclosure proposes a clip for retaining two planar elements assembled together on the main faces thereof, the clip including at least two side walls, each equipped with a groove opening and configured to enable the clip to be inserted on the two assembled planar elements and retain the planar elements against one another. At least one of the side walls is equipped with a slot opening into the groove and defining a flexible arm secured to the rest of the wall by way of a bending area. The free end of the flexible arm supports a stop protruding in the groove.

According to other advantageous and not restrictive characteristics of the disclosure, taken either separately or according to any technically feasible combination:

the clip includes an upper wall and a lower wall, the walls defining a closed volume of square or rectangular section;

the walls are formed of a metal strip bent at right angles;

the ends of the metal strip have additional patterns interlocked with one another;

the ends of the metal strip each have a bend defining the two end planar surfaces, the two end planar surfaces abutting against one another;

at least one of the end surfaces has at least one locking tab for blocking any sliding of the end surfaces relative to one another;

the lower wall and/or upper wall is equipped with a claw configured to apply pressure on the two planar elements when the planar elements are inserted into the grooves; and/or each side wall has a flexible arm.

BRIEF DESCRIPTION OF THE DRAWINGS

Further characteristics and advantages of the disclosure will be clear from the detailed description, made with reference to the accompanying figures, among which.

DETAILED DESCRIPTION

Figure 1:
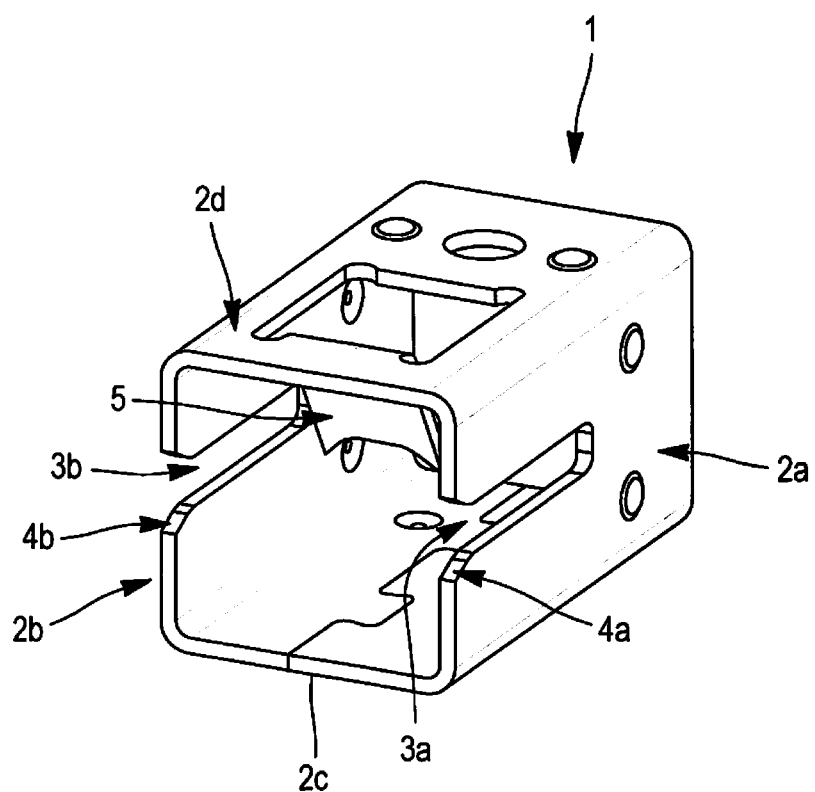
FIG. 1 shows a perspective view of a retaining clip according to the disclosure.

FIG. 1 shows a clip 1 according to the present disclosure. Clip 1 comprises two side walls 2a, 2b, an lower wall 2c, and a upper wall 2d. The four walls 2a, 2b, 2c, 2d define a cuboid, i.e. an enclosed volume of space having a square or rectangular cross-section.

The side walls 2a, 2b of the clip 1 are each equipped with a groove 3a, 3b opening from the same side of the clip. The grooves 3a, 3b are configured to enable the clip 1 to be inserted on the two planar elements assembled together and retain them against one another. As such, the height of the grooves 3a, 3b is adjusted to substantially correspond to the thickness of the assembly formed by the two planar elements. On the side of the face of the clip 1 whereon they open, the grooves 3a, 3b may each have a lead-in chamfer 4a, 4b facilitating insertion of the planar elements into the grooves 3a, 3b of the clip 1 as the clip 1 is positioned on the assembled planar elements. The grooves 3a, 3b, may have a depth that extends over at least half of the length of a side wall. However, and preferably, care shall be taken not to make the grooves 3a, 3b too deep, which would result in making the clip 1 fragile when the forces applied on the planar elements tend to urge portions of the clip 1 away from one another.

Advantageously, the clip 1 is made of metal and produced as a single, integral piece, which enables the clip 1 to be particularly strong, the connection elements being able to form preferred areas of rupture. For example, the clip 1 may be made of a metal strip bent at right angles to define the four walls 2a, 2b, 2c, 2d. Advantageously, the ends of the metal strip have additional complementary profiles that, when the metal strip has been bent to form the clip 1, can be interlocked with one another.

Alternatively, the two ends of the metal strip may each have a bend defining two end planar surfaces 10a, 10b. The two end planar surfaces 10a, 10b abut against one another when the metal strip has been bent to form the clip 1.

One of the ends may have at least one locking tab 11 in order to block any sliding of one end planar surface 10a, 10b against the other. Such a configuration is shown in FIGS. 3a, 3b that will subsequently be described in more detail.

The connections that have just been described are particularly robust to the forces that may be applied on the clip 1. The metal strip, the patterns at the ends thereof, the grooves, the locking tab(s) 11 and any other cuts or deformation of the clip 1 may be formed before bending the metal strip, for example, via cutting techniques, stamping techniques, wet treatments, or heat treatments. Optionally, a plurality of bosses can be formed on the metal strip in order to prevent the planar surfaces of a plurality of metal strips from sticking to one another during the manufacture of the clips 1.

Figure 3A:
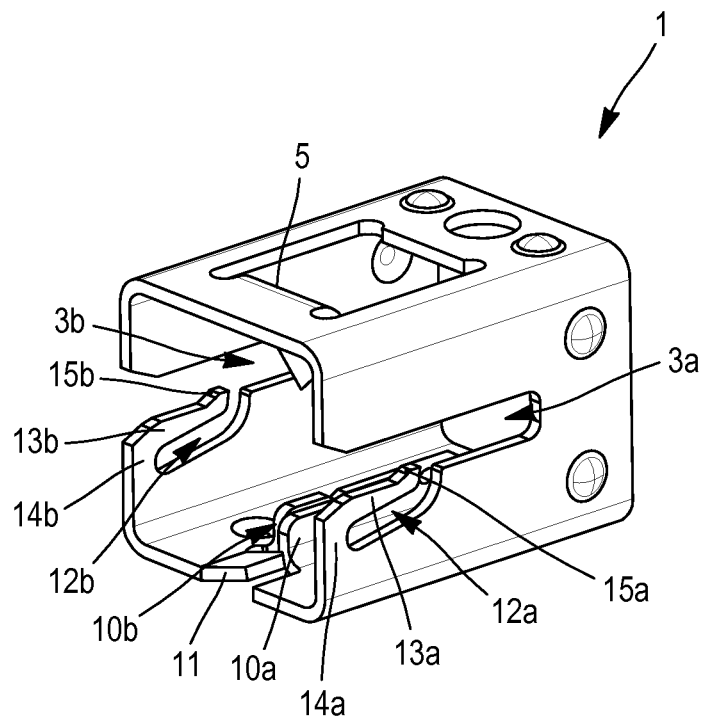
FIGS. 3a and 3b show two variants of a second embodiment of a clip according to the disclosure.
Figure 3B:
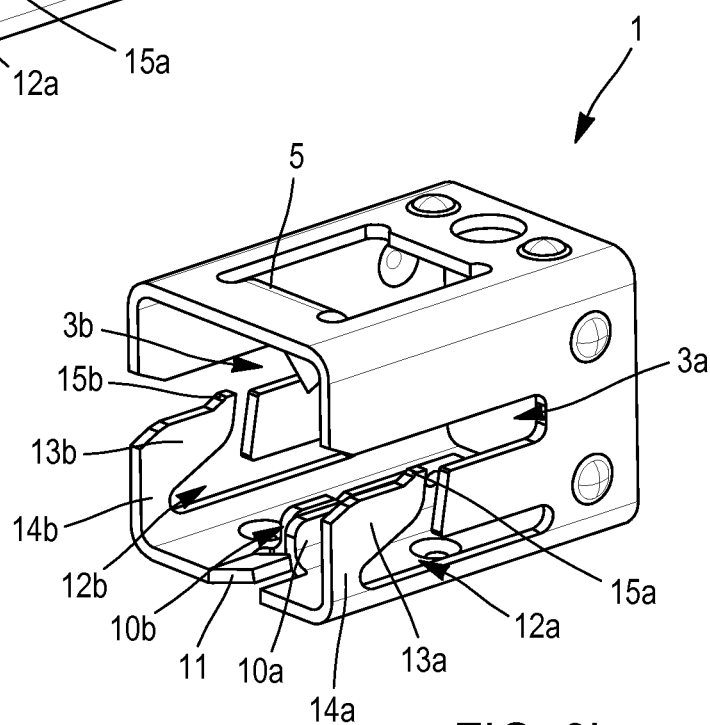

As shown in FIGS. 1, 3a and 3b, the lower wall 2c and/or the upper wall 2d of the clip 1 may be equipped with a claw 5 formed by cutting and bending the metal strip during the manufacture thereof. The claw (or claws) 5 is configured to apply a pressure on the planar elements when the clip 1 is positioned on the planar elements. To this end, the claw 5 is oriented toward the inside of the clip, in the direction of the insertion location for the two planar elements as is shown in the figures.

According to a second embodiment of the disclosure, two different examples of which are shown in FIGS. 3a and 3b, a slot 12a, 12b opening into the groove 3a, 3b can also be formed on the side walls 2a, 2b. The slot 12a, 12b defines a flexible arm 13a, 13b. Each flexible arm 13a, 13b is secured to the rest of the side walls 2a, 2b by means of a bending area 14a, 14b. The free end of each arm supports a stop 15a, 15b slightly overhanging the edges defining the groove 3a, 3b, and, therefore, protruding into the groove when the arms 13a, 13b are in an unflexed condition. In other words, the stop 15a, 15b partially blocks the groove 3a, 3b when the clip 1 is not positioned on the planar elements that it is intended to retain together. The bending of an arm 13a, 13b in the plane defined by the side walls 2a, 2b, at the level of the bending area 14a, 14b, makes it possible to provide access to the bottom of the groove.

According to the shape of the slots 12a, 12b formed on the opposite side walls 2a, 2b, the rigidity of the bending area 14a, 14b connecting each flexible arm to the rest of the clip 1 can be controlled. Thus, and as shown in FIGS. 3a and 3b, flexible arms 13a, 13b can be formed having varied shapes by choosing the geometry of the slots 12a, 12b, which makes it possible to control the rigidity with the bending of each of the arms.

During the insertion of the clip 1 of the second embodiment on two planar elements assembled together, the forces that are applied on the stops 15a, 15b when at least one of the elements comes into contact therewith results in the bending of the flexible arms 13a, 13b. In this way, the access to the bottom of the grooves 3a, 3b is provided by pushing the stops 15a, 15b away from the groove. Therefore, the complete insertion of the clip 1 on the planar elements is made possible.

Figure 4:
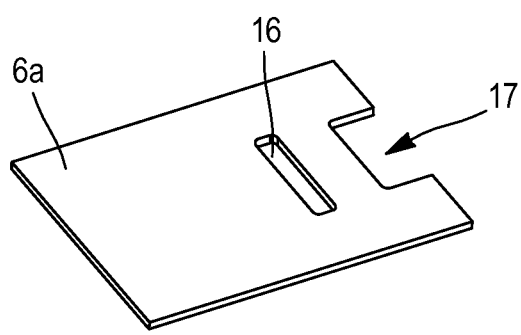
FIG. 4 shows a portion of a rail for receiving a clip according to the second embodiment of the disclosure.

As shown in FIG. 4, the planar element in contact with the flexible arms 13a, 13b may be equipped with an opening 16 positioned such that when the clip 1 is fully in place on the planar elements that it retains together, the stops 15a, 15b are positioned opposite the opening 16 and/or engaged with one of the edges of opening 16. In this way, at least partial release of the bending of the flexible arms 13a, 13b is made possible and blocking of the planar element is provided.

In the case of the clip 1 of the second embodiment of the disclosure as shown in FIG. 3a or 3b, the assembly between the two planar elements may be retained by the claw 5 and, in particular, by the pressure applied by the claw 5 on the planar element with which the claw 5 is in contact. In addition, in this embodiment, the planar element that is not in direct contact with the claw 5 is also retained in the clip 1 by the stops 15a, 15b, supported by the flexible arms 13a, 13b, and inserted into the opening 16 arranged in the planar element. Thus, this prevents the planar element from moving by sliding in relation to the other planar element of the assembly.

When the planar elements are metallic, it is advantageous to choose the metal constituting the clip 1 so that it is harder than the metal of the planar elements. This may be a steel or a stainless steel. The scratching that therefore forms on at least one of the planar elements during the insertion of the clip 1, contributes to holding the clip 1 in position and establishing a quality electrical contact. The electrical contact may be used to advantage to propagate an earth shared by all of the metal elements in contact.

Figure 2:
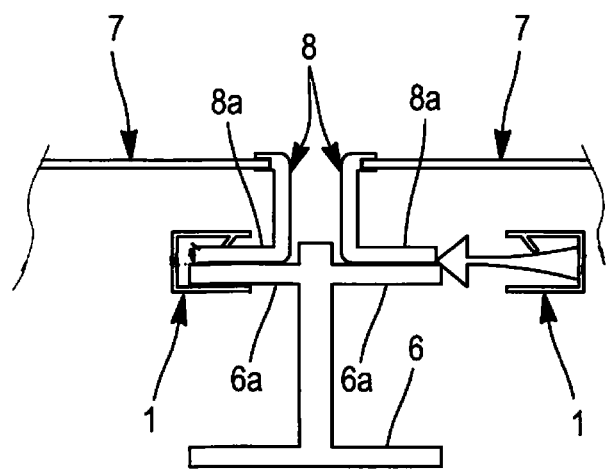
FIG. 2 shows a cross-sectional view of an example of use of the clip according to the disclosure.

FIG. 2 shows an example of use of a clip 1 according to the disclosure.

In this figure, two photovoltaic panels 7 are respectively placed on a rail 6 of a supporting structure. Panels 7 each include a frame 8, a wing 8a of which forms a first planar element that rests upon a second planar element 6a of the rail 6. On the left side of FIG. 2, a first clip 1 according to the disclosure has been inserted on the two planar elements 8a, 6a in order to retain the same assembled securely together. On the right side of this figure, the movement of insertion of the clip 1 on the two planar elements 8a, 6a in order to secure the second photovoltaic panel 7 to the supporting structure is shown symbolically.

Figure 5:
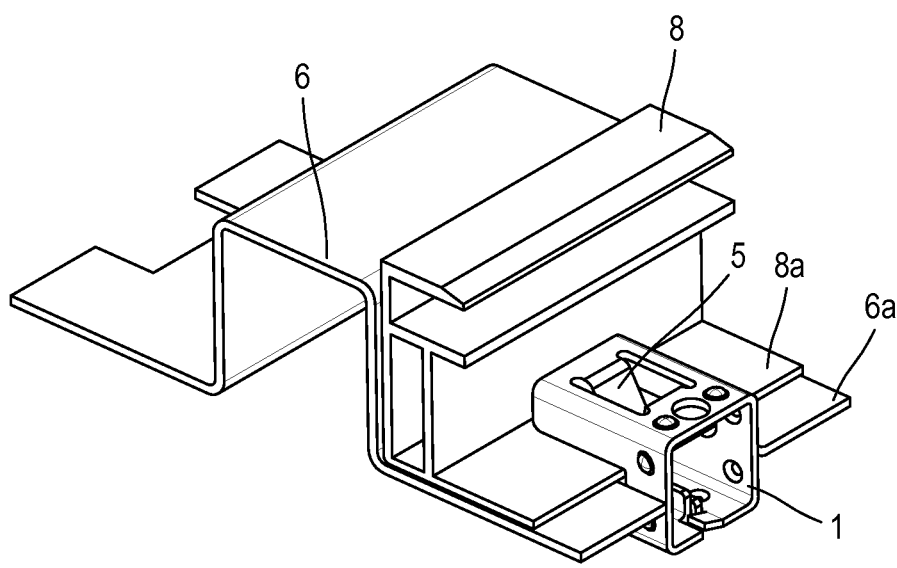
FIG. 5 shows a perspective view of an example of use of a clip according to the second embodiment of the disclosure.

FIG. 5 shows another example of use of a clip 1 according to the disclosure. This figure shows the planar element 6a of the rail 6 and the planar element or wing 8a of a frame 8 of a photovoltaic panel. A section of the planar element 6a is also shown in FIG. 4. It should be noted that the planar element 6a may include a notch 17 in order to make the clip 1 penetrate deeper into the planar element.

Of course, the disclosure is not limited to the described embodiments and alternative solutions can be used without leaving the scope of the disclosure as defined in the claims.

Thus, although it has been shown in the second embodiment of the disclosure that a clip 1 could include both a claw 5 and flexible arms 13a, 13b, a clip 1 according to the disclosure including only the claw 5, only the flexible arms 13a, 13b, or none of these means is also within the scope of the present disclosure. In the case in which the clip 1 includes none of these means, the two planar elements are retained together by the grooves only.

Furthermore, and although it was demonstrated in the examples shown that each side wall 2a, 2b could be equipped with a flexible arm 13a, 13b, the two side walls do not need to be equipped with such an arm, and forming only one of the arms on one or other of the walls only (or on none of them) is also within the scope of the present disclosure.

Furthermore, it is not necessary for the clip 1 to be defined by four walls defining a closed volume of square or rectangular section. A clip 1, the section of which could have a completely different shape, is also contemplated, as long as the clip 1 comprises side walls, opposite one another, for arranging the retaining grooves 3a, 3b.

The invention claimed is:

1. A clip for retaining two planar elements assembled together at the main faces thereof, the clip including at least two side walls each equipped with a groove opening and configured to enable the clip to be inserted on the two assembled planar elements and retain same against one another, at least one of the side walls being equipped with a slot opening into the groove opening and defining a flexible arm secured to a remainder of the at least one of the side walls by means of a bending area, a free end of the flexible arm supporting a stop protruding into the groove opening, and further comprising an upper wall and a lower wall, the at least two side walls, the upper wall, and the lower wall together defining an enclosed volume of space having a square or rectangular cross-section.

2. The clip of claim 1, wherein the at least two side walls, the upper wall, and the lower wall are formed from a metal strip bent at right angles.

3. The clip of claim 2, wherein ends of the metal strip have complementary patterns interlocked with one another.

4. The clip of claim 2, wherein ends of the metal strip each have a bend defining two end planar surfaces, the two end planar surfaces abutting against one another.

5. The clip of claim 4, wherein at least one of the two end planar surfaces has at least one locking tab for preventing the end planar surfaces from sliding relative to one another.

6. The clip of claim 1, wherein the lower wall and/or the upper wall is equipped with a claw configured to apply pressure on the two planar elements when the same are inserted into the groove openings.

7. The clip of claim 1, wherein each side wall has a flexible arm.

* * * * *